Sept. 7, 1954    H. M. GEYER    2,688,232
SYNCHRONIZED LOCKING ACTUATOR
Filed June 22, 1953    3 Sheets-Sheet 2
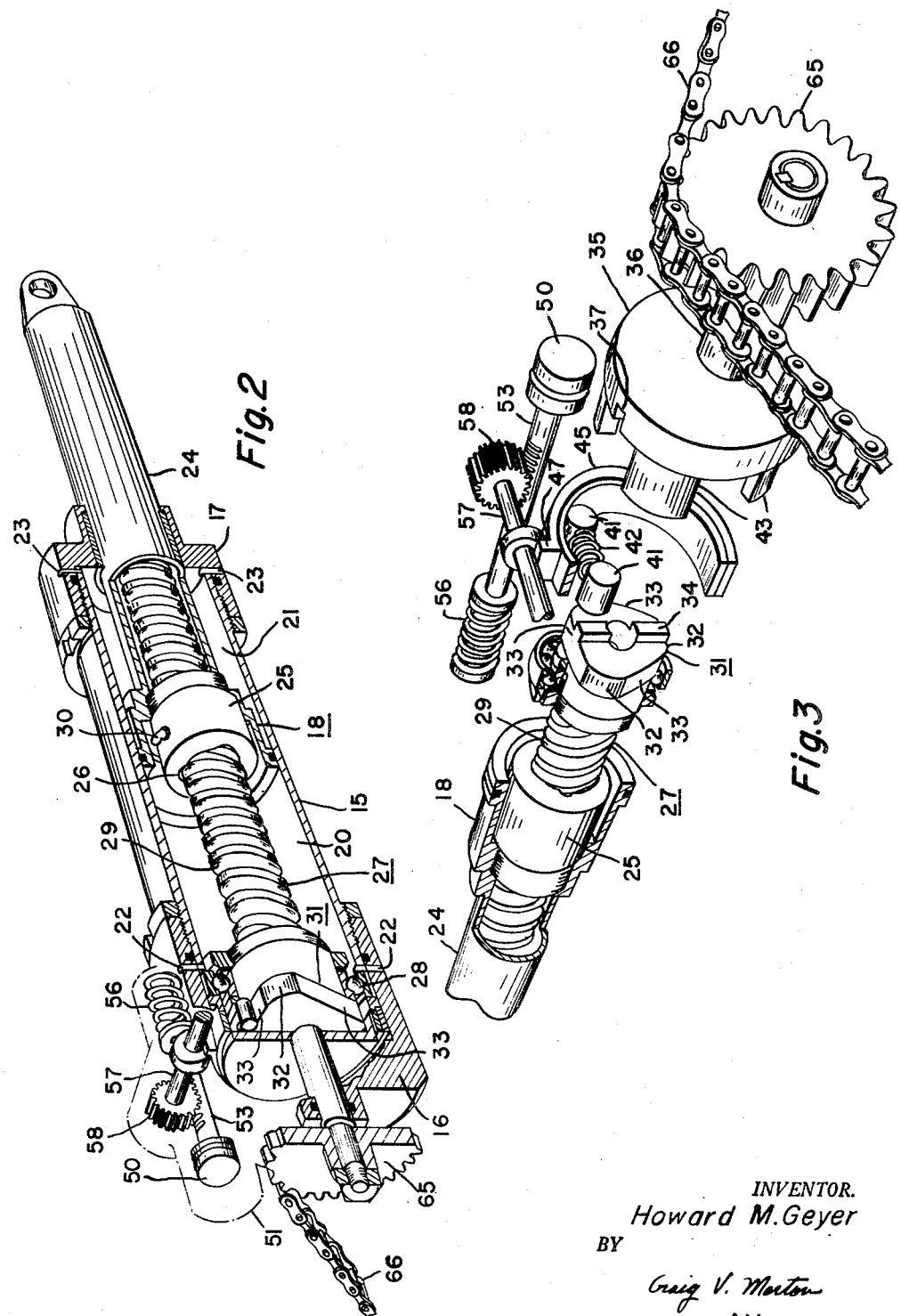
INVENTOR.
Howard M. Geyer
BY
Craig V. Morton
Attorney Sept. 7, 1954          H. M. GEYER          2,688,232
SYNCHRONIZED LOCKING ACTUATOR
Filed June 22, 1953          3 Sheets-Sheet 3
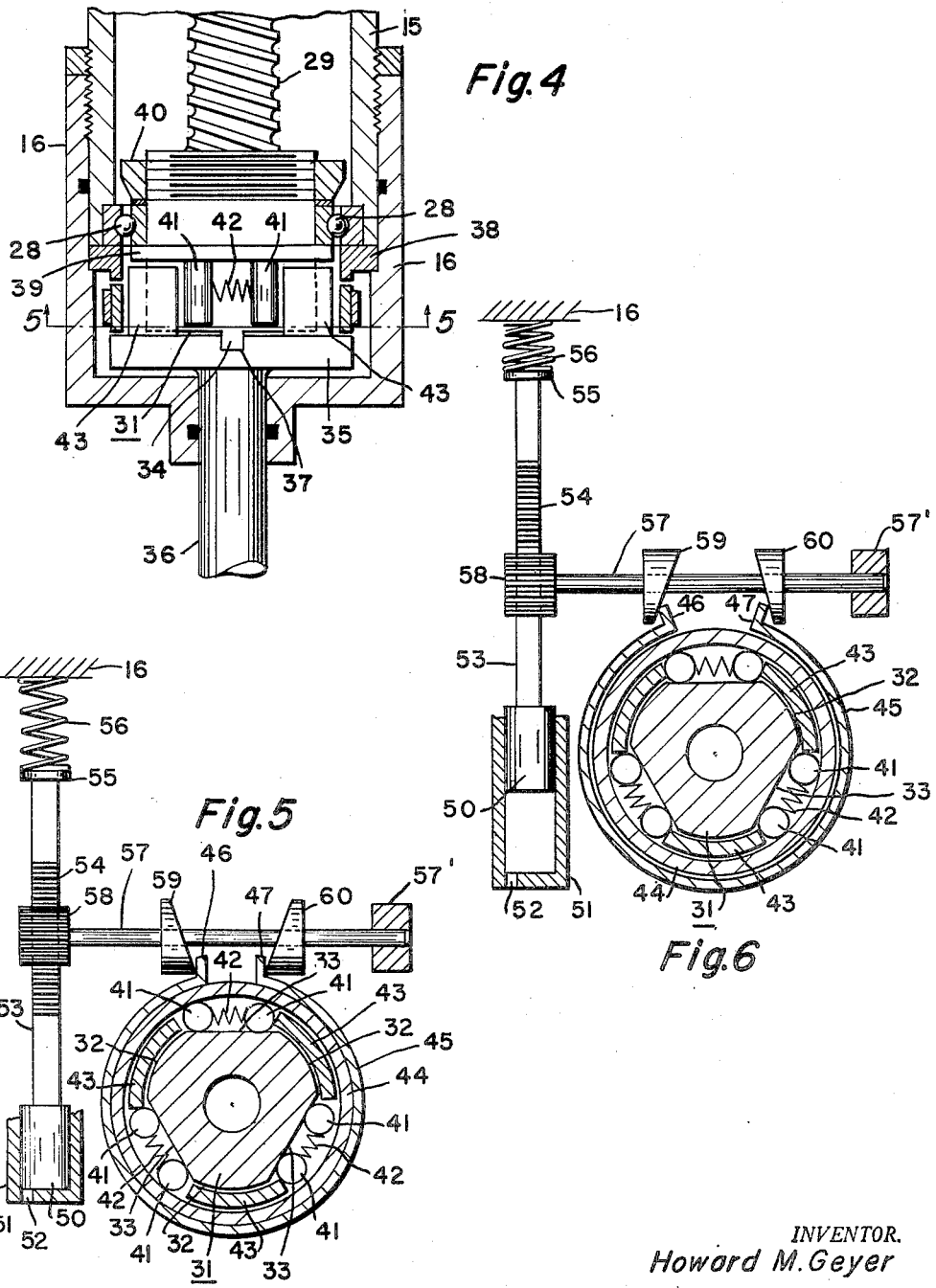
INVENTOR.
Howard M. Geyer
BY
Craig V. Morton
Attorney

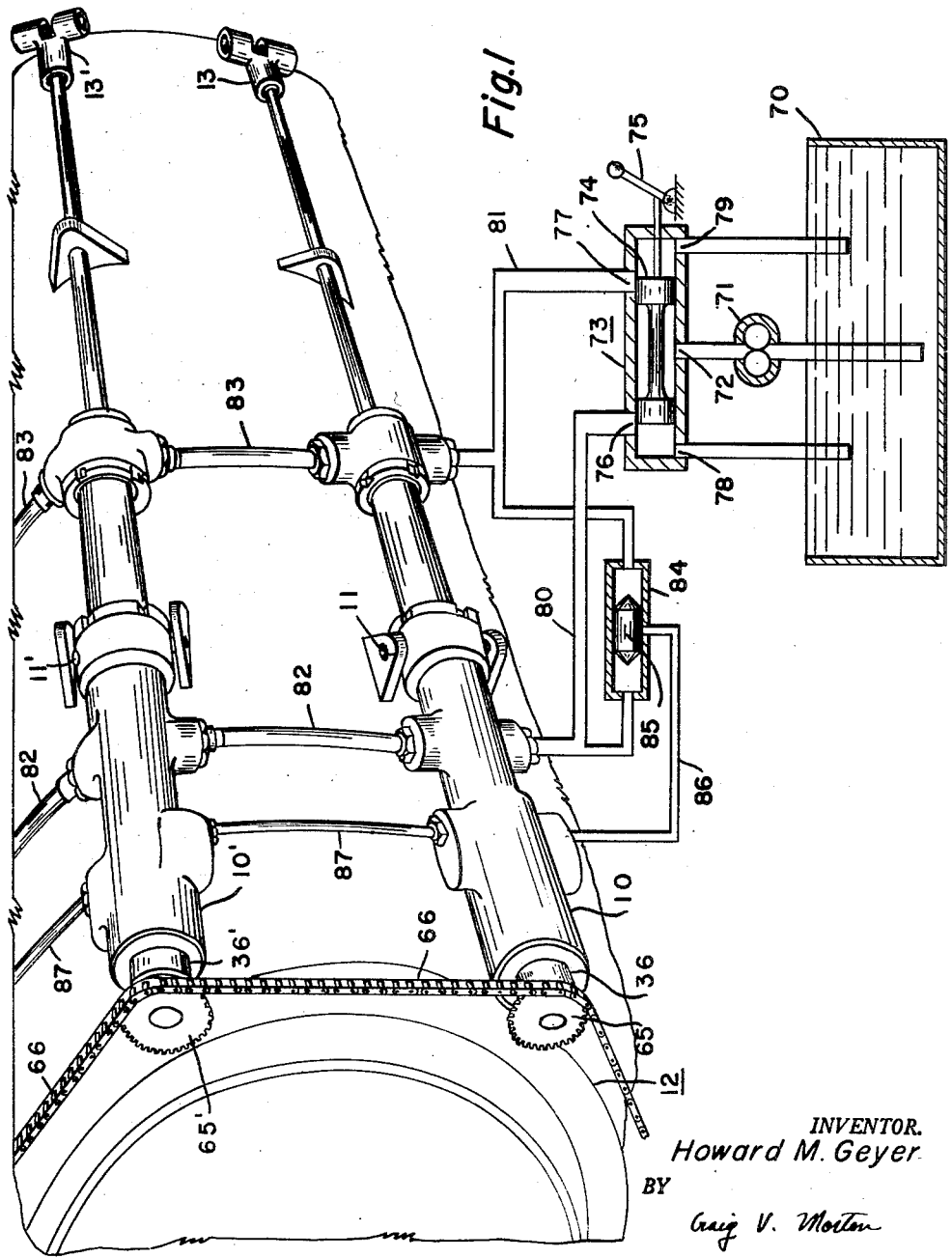

Patented Sept. 7, 1954

2,688,232

UNITED STATES PATENT OFFICE 2,688,232

SYNCHRONIZED LOCKING ACTUATOR

Howard M. Geyer, Dayton, Ohio, assignor to General Motors Corporation, Detroit, Mich., a corporation of Delaware Application June 22, 1953, Serial No. 363,168

16 Claims. (Cl. 60—97)

This invention pertains to means for synchronizing the operation of a plurality of fluid operated actuators, and more particularly to means for synchronizing the operation of a plurality of self-locking, fluid pressure operated actuators.

Heretofore, a plurality of power transmitting devices, or actuators, operated by fluid pressure, have been synchronized by means of a power transmitting connection between adjacent actuators. However, a simple power transmitting interconnection, while satisfactory, for synchronizing the operation of some types of fluid pressure operated actuators, is unsatisfactory for synchronizing the operation of a plurality of self-locking actuators. This face becomes apparent when it is understood that if the locking means of one actuator failed to release for some reason, a simple power transmitting connection between adjacent self-locking actuators would not affect synchronous movement. Accordingly, among my objects are the provisions of means for synchronizing the operation of a plurality of fluid pressure operated, self-locking actuators; the further provision of self-locking, fluid pressure operated actuators capable of being synchronized; and the still further provision of synchronizing means for actuators of the aforesaid character wherein a locked actuator may be operated mechanically in synchronism with other unlocked, fluid pressure operated actuators.

The aforementioned and other objects are accomplished in the present invention by incorporating no-back means, in the synchronizing interconnection of each self-locking actuator. Specifically, each actuator includes a cylinder having disposed therein a reciprocable piston capable of fluid pressure actuation in either direction. The piston carries a hollow member having a spirally grooved interior surface, the hollow member being restrained against rotation relative to the piston and constrained for linear movement with the piston. The hollow member forms part of the well known ball-screw and nut combination, the screw taking the form of a shaft rotatably journaled in the cylinder and having an exterior spiral groove which is interconnected with the hollow member, or nut, by a plurality of circulating balls. The piston also includes a longitudinally extending rod which projects through an end wall of the cylinder and is adapted for connection to a relatively movable rod device that precludes rotation of the piston relative to the cylinders. However, linear piston movement results in, and is dependent on, rotation of the screw shaft relative to the nut and piston.

Each actuator also includes mechanical locking means operatively associated with the screw shaft for normally preventing rotation of the screw shaft, and, consequently, preventing reciprocable movement of the piston. The locking means are maintained in the energized, or locked, position by resilient means, and may be actuated so as to free the screw shaft for rotation by fluid pressure operated releasing means. As disclosed herein, fluid pressure is admitted to the lock releasing means concurrently with the application of pressure fluid to the actuator cylinder. Thus, relative rotation between the screw shaft and piston-nut assembly is permitted when actuator movement is desired.

Each actuator also includes no-back means which cooperate with the locking means. In the disclosed embodiment the locking means is constituted by a brake band that cooperates with an annular member. In the absence of fluid pressure application to the actuator cylinder, the brake band is contracted by its inherent resiliency to preclude rotation of the annular member. The screw shaft is rotatably connected to a cam member coaxially disposed within the annular member, the cam member having three flat surfaces separated by a like number of arcuate surfaces. A double acting clutch is mounted on each of the flat cam surfaces, the clutches comprising a pair of rollers normally urged apart by a preloaded spring. A clutch operator having three axially extending figures, coaxially disposed between the arcuate surfaces of the cam member and the annular member, is mounted for arcuate movement relative to the cam member for engaging one roller of each clutch to permit movement of the cam member and clutch operator relative to the annular member in either direction. However, by the arrangement disclosed, the no-back means can only be partially released by the clutch operator, so that the screw shaft and cam member are only freed for rotation in one direction relative to the annular member.

The cam members and clutch release operators of adjacent actuators may be interconnected by any suitable power transmitting means, such as a chain drive. When the operator desires to adjust the several actuators, fluid under pressure is applied concurrently to all actuators and if the locking means of each actuator is released, the screw shaft of each actuator is freed for rotation, thereby permitting linear movement of the actuator piston. Rotation of the screw shaft will effect rotation of the cam member which, in turn, will rotate the entire no-back unit including the clutch operator and the annular member, and inasmuch as the cam members of adjacent actuators are interconnected, movement of the several actuator pistons will be synchronized and the load will be equally divided therebetween. In the event that one or more of the lock releasing means fails to free the annular member of one or more actuators for rotation, the actuator, or actuators, in which the locking means are released, will nevertheless effect synchronous movement of all actuators inasmuch as the cam members of adjacent actuators are interconnected. Thus, linear movement of the piston of one actuator by the application of pressure fluid thereto will effect linear movement of all actuators in the multiple actuator installation inasmuch as the screw shafts of all actuators will be rotated in unison, thereby effecting synchronized linear movement of the pistons.

Further objects and advantages of the present invention will be apparent from the following description, reference being had to the accompanying drawings wherein a preferred embodiment of the present invention is clearly shown.

In the drawings:

Fig. 1 is a composite view illustrating a pair of interconnected actuators in elevation and a schematic diagram of a fluid pressure system for operating the actuators.

Fig. 2 is a perspective view, partly in section and partly in elevation, of an actuator constructed according to this invention.

Fig. 3 is an exploded view depicting certain parts of the actuator shown in Fig. 2.

Fig. 4 is a diagrammatic view of the actuator locking means and synchronizing no-back means.

Fig. 5 is a sectional view taken along line 5—5 of Fig. 4 with the no-back means in the locked position.

Fig. 6 is a sectional view taken along line 5—5 of Fig. 4 with the no-back means shown in the partially released position.

With particular reference to Fig. 1 of the drawings, a multiple actuator installation is shown comprising a pair of fluid pressure operated actuators 10 and 10', the cylinders of which are attached at 11 and 11' to fixed supporting structure 12, and the pistons of which include rod portions extending through an end wall of the cylinders, the ends of the piston rods being provided with fixture members 13 and 13', which are adapted for connection to any suitable load device, or devices, not shown. Referring to Fig. 2, the construction of an actuator employed in the multiple actuator installation, in Fig. 1, will next be described, it being understood that each of the several actuators in the installation are of identical construction.

The actuator includes a cylinder 15 having threaded portions adjacent each end thereof, which receive end caps 16 and 17, respectively. A piston 18 is mounted for reciprocable movement within the cylinder 15 under the urge of fluid pressure. The piston 18 divides the cylinder 15 into an extend chamber 20 and a retract chamber 21. The head cap 16 includes passage means 22, which communicate with extend chamber 20, and the tail cap 17 includes passage means 23, which communicate with the retract chamber 21.

The piston 18 includes an integral, recessed piston rod 24, which projects through the tail cap 17 and is adapted for attachment to a fixture, as shown in Fig. 1. The fixtures 13 and 13' of Fig. 1, in turn, are attached to a movable member, or members, not shown, which prevent rotation of the piston 18 relative to the cylinder 15. The piston 18 also carries a hollow member 25, which is restrained against rotation relative to the piston, and is constrained for linear movement with the piston. The hollow member 25 has a spirally grooved interior passage 26 and constitutes a component of the well known ball-screw and nut assembly. A screw shaft, or threaded member 27, is rotatably journaled by a bearing means 28 within head cap 16. The screw shaft 27 has a complementary spirally grooved portion 29, which threadingly engages the spirally grooved nut 25 through the medium of a plurality of circulating balls, not shown, disposed within the nut 25 and circulating through a passage 30.

The end of the screw shaft 27 is formed as a cam member 31 having three arcuate portions 32 separated by three flats 33. The cam member 31 is additionally formed with an axially extending tongue portion 34, the purpose of which will be described hereinafter. Suffice it here to say that linear movement of the piston 18 is dependent upon relative rotation between the hollow member 25 and the rotatably mounted member 29.

With particular reference to Figs. 2 through 6, and particularly Fig. 4, it will be noted that the head portion of the screw shaft 29, forming the cam 31, is rotatably connected by means of the tongue 34 to an annular flange 35 of a shaft 36 extending through the head cap 16. The tongue 34 of the cam 31 is loosely received within a diametrical groove 37 in the flange 35. As is also shown in Fig. 4, the outer race of the bearing means 28 is retained between an integral shoulder formed on the cylinder 15 and an annular member 38, which abuts an integral flange formed on the head cap 16. The inner race of the bearing means 28 is retained against a shoulder 39 on the head portion of the screw shaft 29 by means of a threaded device 40.

The cam member 31 forms a component of the no-back means heretofore alluded to. In essence, the no-back means constitutes a clutch arrangement which may only be released to permit rotation in one direction at a time. The no-back means comprises three sets of rollers, each including a pair of rollers 41 disposed on the flats 33 of the cam 31 and urged apart by a preloaded spring 42. The three arcuate surfaces 32 of the cam 31 are surrounded by concentrically disposed fingers 43, which constitute a clutch operator, or no-back releasing means. The fingers 43 and the rollers 41 are, in turn, encompassed by an annular member 44 coaxially disposed relative to the screw shaft 29. The fingers 43, situated between the annular member 44 and the arcuate surfaces of the cam 31, project from the annular flange 35 of the shaft 36. The operation of the no-back means will be described more fully hereinafter, and suffice it here to say that when the springs 42 urge the rollers to the position they assume in Fig. 6, rotation of the cam member 31 relative to the annular member 44 is precluded in both directions.

The annular member 44 is encompassed by a brake band 45 having upturned end portions 46 and 47. When the brake band 45 is in the contracted position, as shown in Fig. 5, rotation of the annular member 44 is precluded, and inasmuch as the roller clutch arrangement prevents relative rotation between the annular member 44 and the cam 31 in the position shown in Fig. 6, rotation of the cam member 31 and, hence, the screw shaft 29 is likewise prevented. Consequently, the brake band 45 constitutes the means for locking the actuator piston 18 against movement, inasmuch as linear movement of the piston 18 is dependent upon rotation of the screw shaft 29 relative thereto. Thus, with the brake band 45 positively restraining rotation of the member 44, and the no-back means engaged, the actuator is mechanically locked.

The lock releasing means for each actuator includes a reciprocable, fluid pressure operated piston 50 disposed in head cap 16. The piston 50 is adapted for reciprocable movement within a lock releasing cylinder 51 into which fluid under pressure may be admitted through port 52. The piston 50 includes a longitudinally extending rod portion 53 having formed on an intermediate portion thereof a rack 54 and adjacent the end thereof a flange, or spring seat 55. A spring 56 having engagement with a portion of the head cap 16 at one end and with the spring seat 55 at the other end, normally urges the piston 50 into engagement with the end of the cylinder 51, as is shown in Fig. 5. A shaft 57 having a pinion 58 is rotatably journaled by bearing means 57', the pinion 58 meshing with rack 54 so that upon linear movement of the piston 50 and rod 53, the shaft 57 will be rotated. The shaft 57 carries a pair of axially spaced cam members 59 and 60, which engage the upturned ends 46 and 47 of the brake band 45. In the absence of fluid pressure application to the cylinder 51, the spring 56 urges the piston 50 and the rod 53 to the position shown in Fig. 5, wherein the cams 59 and 60 contract the brake band 45 and lock the annular member 44 against rotation. Upon the application of pressure fluid to the cylinder 51, the piston 50 will move to the position shown in Fig. 6 wherein the shaft 57 is rotated approximately 180° whereby the cams 59 and 60 are spread apart relative to the upturned ends 46 and 47 of the brake band 45, thereby permitting the brake band 45 to expand by virtue of its inherent resiliency to free the annular member 44 for rotation.

As is shown particularly in Figs. 1 and 3, the shafts 36 and 36' of adjacent actuators have attached thereto sprocket wheels 65 and 65'. The sprocket wheels of all actuators in the multiple actuator installation are interconnected for synchronized rotation by means of a chain 66.

A typical fluid pressure system for operating the actuators in the several actuators of the multiple actuation installation is also shown in Fig. 1, and includes a reservoir 70 containing a quantity of hydraulic fluid. A pump 71 draws fluid from the reservoir 70 and supplies fluid under pressure to a supply port 72 of a valve 73. The valve 73 comprises a housing having a bore within which a reciprocable plunger 74, having axially spaced lands, is disposed. The plunger 74 may be moved in either direction from a neutral position, as shown in Fig. 1, by means of a pivotally mounted lever 75. The valve housing also includes actuator ports 76 and 77, and drain ports 78 and 79, the drain ports being connected to the reservoir 70, and the actuator ports 76 and 77 being connected to the drain ports 78 and 79 when the plunger 74 is in the neutral position as shown in Fig. 1. Actuator port 76 is connected by a conduit 80 to the extend port of actuator 10, the extend ports of all actuators in the multiple actuator installation being interconnected by conduits 82. Actuator port 77 is connected by a conduit 81 to the retract port of actuator 10, the retract ports of adjacent actuators likewise being connected by conduits 83. Branch passages of the conduits 80 and 81 connect with a shuttle valve casing 84 within which is disposed a pressure responsive valve element 85. The outlet port of the shuttle valve 84 is connected by a conduit 86 to the lock release cylinder port of actuator 10, the lock release cylinder ports of adjacent actuators likewise being interconnected by conduits 87. The shuttle valve element 85 operates in a conventional manner and moves to connect conduit 86 to either conduit 80 or 81, depending upon which conduit is connected by the valve 73 to the pressure supply port 72.

*Operation*

The operation of a single actuator will first be described and, thereafter, the operation of a plurality of actuators in synchronism will be described. If the operator moves lever 75 so as to move the plunger 74 to the left, as viewed in Fig. 1, high pressure fluid will be applied through conduit 80 to the extend chamber 20 of actuator 10, while the retract chamber is connected to drain through conduit 81 and ports 77 and 79. Inasmuch as conduit 80 is exposed to high pressure fluid, the shuttle valve element 85 will move to the right, thereby applying high pressure fluid to the lock releasing means of actuator 10. The application of high pressure fluid to the lock releasing means will effect movement of the piston 50, thereby effecting rotation of the shaft 57 and the cams 59 and 60 permitting the brake band 45 to expand. Expansion of the brake band 45 permits rotation of annular member 44, and inasmuch as high pressure fluid is concurrently applied to the extend actuator chamber while the retract actuator chamber is connected to drain, the actuator piston will move to the right, as viewed in Fig. 2, thereby effecting rotation of the screw shaft 29. Rotation of the screw shaft 29, in turn, effects rotation of the no-back means as a unit inasmuch as the roller assemblies are in the position of Fig. 6, whereby relative rotation between the cam member 31 and the annular member 44 is precluded. Consequently, cam member 31 will rotate the fingered member and shaft 36 and the member 44 in the same direction through the engaged roller assembly.

When the selector actuator movement has been accomplished by the actuator, the operator moves the valve plunger 74 to the neutral position, as shown in Fig. 1, wherein communication between the high pressure port 72 and both actuator ports 76 and 77 is blocked. As the lock cylinder 51 is connected to drain in this instance, the spring 56 will move the piston 50 to the position shown in Fig. 5, thereby effecting rotation of the shaft 57 to again contract the brake band 45 and lock the annular member 44, and, hence, the screw shaft 29 against rotation. Thus, it is apparent that upon application of pressure fluid to either of the actuator chambers, the locking means are concurrently released to permit piston movement, while when the application of pressure fluid to either actuator chambers is interrupted, the locking means are again rendered operative to prevent linear piston movement.

When a plurality of actuators of the type aforedescribed have their sprocket wheels interconnected by a chain in the manner in which actuators 10 and 10' are interconnected in Fig. 1, and the lock releasing cylinders, and both actuator chambers of all actuators are interconnected to a common source of fluid pressure, the operation is as follows. If, upon manual operation of the valve 73 to either extend or retract all actuators in the multiple actuator installation, the locking means of each actuator is released, the power transmitting interconnection between the actuators, namely, chain 66, will merely maintain piston movement of all actuators in synchronism, and in addition will assure that the load is equally divided between the several actuators. However, if for some reason, such as a blocked conduit, the locking means of one or more actuators in the multiple actuator installation, but not the locking means of all actuators, fail to release upon the application of pressure fluid to an actuator chamber, all actuators in the system will still move in synchronism by reason of the power transmitting interconnection and the no-back means. Thus, if the locking means of actuator 10' fail to release and the locking means of actuator 10 do release, the application of fluid pressure to either the extend or retract chamber of actuator 10 will effect movement of the piston within the actuator cylinder and rotation of the screw shaft. Linear movement of the piston in the actuator 10 will effect rotation of the sprocket wheel 65 through the engaged no-back means about which the brake band 45 is released, as shown in Fig. 6. Inasmuch as the locking means are not released in actuator 10', the brake band will be in the position shown in Fig. 5. Accordingly, if we assume that sprocket wheel 65 is rotated in a counterclockwise direction, as viewed in Fig. 1, the chain 66 will effect counterclockwise rotation of sprocket wheel 65', which will move the fingers 43 of shaft 36 relative to the cam 31 (permitted by the loose connection therebetween) to the position shown in Fig. 5, thereby partially releasing the roller clutches to permit counterclockwise movement of the cam 31 and the fingers 43 relative to the fixed annular member 44. Counterclockwise rotation of cam member 41 will, in turn, effect counterclockwise rotation of the screw shaft in actuator 10' to thereby effect linear movement of the piston in actuator 10' and in synchronism with the piston of actuator 10. Thus, in the absence of pressure fluid application to actuator 10', the mechanical interconnection between actuators 10 and 10' will effect synchronous movement, upon the application of pressure fluid to actuator 10.

From the foregoing, it is apparent that the present invention provides synchronizing means for a plurality of locking fluid pressure operated actuators, which synchronizing means are operative to assure like movements of all actuators even though the releasable locking means of all, except one, of the actuators in the installation fail to release. If all actuators are operating properly, that is, the locking means of each actuator is released upon the application of pressure fluid to one of the actuator chambers, the power transmitting interconnections between adjacent actuators only serve to keep the several actuators in step and maintain the load equally divided therebetween.

While the embodiment of the present invention as herein disclosed, constitutes a preferred form, it is to be understood that other forms might be adopted.

What is claimed is as follows:

1. In combination with a plurality of actuators each comprising, a cylinder and a reciprocable piston disposed in said cylinder capable of fluid pressure actuation in either direction, a member rotatably supported within the cylinder and operatively connected to the piston such that said member will rotate in response to linear movement of said piston, releasable locking means operatively associated with said member normally operative to prevent rotation of said member and consequent linear movement of said piston in the absence of fluid pressure application to said cylinder, and means interconnecting the rotatable members of adjacent actuators for effecting synchronous operation thereof.

2. In combination with a plurality of actuators each comprising, a cylinder and a reciprocable piston disposed in said cylinder capable of fluid pressure actuation in either direction, a member rotatably supported within the cylinder and operatively connected to the piston such that said member will rotate in response to linear movement of said piston, locking means operatively associated with said piston to prevent linear movement thereof, means operatively associated with said locking means and operable to release said locking means to permit linear movement of said piston and consequent rotation of said member upon the application of fluid pressure to said cylinder, and means operatively interconnecting the rotatable members of adjacent actuators for effecting synchronous operation thereof.

3. In combination with a plurality of actuators each comprising, a cylinder and a reciprocable piston disposed in said cylinder capable of fluid pressure actuation in either direction, a member rotatably supported within the cylinder and operatively connected to the piston, the operative connection between said piston and member including an element operatively connected with said piston and constrained to move lineally therewith, said element having operative engagement with said rotatable member such that relative rotation will occur between said element and member upon linear movement of said piston, releasable locking means operatively associated with said rotatable member for preventing rotation of said member and consequent linear movement of said piston in the absence of fluid pressure application to said cylinder, and means interconnecting the rotatable members of adjacent actuators for effecting synchronous operation thereof.

4. In combination with a plurality of actuators each comprising, a cylinder and a reciprocable piston disposed in said cylinder capable of fluid pressure actuation in either direction, a member rotatably supported within the cylinder and operatively connected to the piston, the operative connection between said piston and member including an element operatively connected with said piston and constrained to move lineally therewith, said element having operative engagement with said rotatable member such that relative rotation will occur between said element and member upon linear movement of said piston, locking means operatively associated with said piston for preventing linear movement thereof, fluid pressure operated means operatively associated with said locking means and operable to release said locking means to permit linear movement of said piston and consequent rotation of said rotatable member upon the application of fluid pressure to said cylinder, and means interconnecting the rotatable members of adjacent actuators for effecting synchronous operation thereof.

5. A multiple actuator system including in combination, a plurality of linear actuators each adapted for connection at one end to a relatively fixed support and at the other end to a relatively movable load device, each actuator including a cylinder having disposed therein a lineally movable piston capable of fluid pressure actuation in either direction, and means interconnecting the actuator pistons constructed and arranged to effect synchronous operation of said actuators, said means including a rotatable member in each cylinder operatively connected to the piston in each cylinder such that said member will rotate in response to linear movement of said piston, releasable locking means operatively associated with the rotatable member of each actuator and operable to prevent rotation of the rotatable member of each actuator in the absence of fluid pressure application to the actuator cylinder, and means interconnecting the rotatable members of said actuators.

6. The combination with a plurality of fluid pressure operated actuators, each including, a cylinder, a reciprocable piston disposed in said cylinder capable of fluid pressure actuation in either direction, and releasable locking means operatively associated with said piston operable to prevent movement of said piston in the absence of fluid pressure application to said cylinder, of means operatively associated with said locking means of each actuator and operable to permit linear movement of said piston with the locking means in the engaged position.

7. The combination with a fluid pressure operated actuator including, a cylinder, a lineally movable piston disposed in said cylinder capable of fluid pressure actuation in either direction, a member rotatably supported in said cylinder and operatively connected with said piston such that said member will rotate in response to linear movement of said piston, and releasable locking means operatively associated with said member and normally operative to prevent rotation of said member and consequent linear movement of said piston in the absence of fluid pressure application to said cylinder, of means operatively associated with the locking means and the rotatable member for freeing said rotatable member for rotation with the locking means in the locked position.

8. The combination with a fluid pressure operated actuator including, a cylinder, a lineally movable piston disposed in said cylinder capable of fluid pressure actuation in either direction, a member rotatably supported in said cylinder and operatively connected with said piston such that said member will rotate in response to linear movement of said piston, and releasable locking means operatively associated with said member and normally operative to prevent rotation of said member and consequent linear movement of said piston in the absence of fluid pressure application to said cylinder, said locking means comprising a brake band operatively associated with an annular member which is operatively connected to said rotatable member, of means operatively associated with said locking means and operative to free said rotatable member for rotation with the brake band in engagement with and restraining rotation of the annular member.

9. A fluid pressure operated, self-locking actuator designed for synchronous operation with other like actuators comprising in combination, a cylinder, a reciprocable piston disposed in said cylinder capable of fluid pressure actuation in either direction, a rotatable member mounted in said cylinder and operatively connected to said piston such that said member will rotate in response to linear movement of said piston, locking means operatively associated with said member for normally preventing rotation thereof, means operatively associated with said locking means and operable to release said locking means so as to free said member for rotation and permit linear movement of said piston, and means operatively associated with said locking means and said rotatable member to free the rotatable member for rotation independent of and with the locking means in the engaged position.

10. A fluid pressure operated, self-locking actuator designed for synchronous operation with other like actuators comprising in combination a cylinder, a reciprocable piston disposed in said cylinder capable of fluid pressure actuation in either direction, a member rotatably mounted in said cylinder and operatively connected to said piston, the operative connection between said member and piston including an element connected with said piston and constrained to move lineally therewith, said element having operative engagement with said rotatable member such that relative rotation will occur between said element and member upon linear movement of said piston, locking means operatively associated with said member for normally preventing rotation thereof, means operatively associated with said locking means and operable to release said locking means so as to free said member for rotation and permit linear movement of said piston, and means operatively associated with said locking means and said rotatable member to free the rotatable member for rotation independent of and with the locking means in the engaged position.

11. The combination set forth in claim 9 wherein the locking means include an annular member operatively connected to the rotatable member of said actuator and a brake band operatively associated with said annular member and operable to prevent rotation of said annular member and said rotatable member.

12. The combination set forth in claim 11 wherein the operative connection between said annular member and said rotatable member includes a cam member coaxially disposed with respect to said annular member, said cam member having a plurality of flats separated by a like number of arcuate surfaces, and a plurality of roller-lock mechanisms mounted on said flats.

13. The combination set forth in claim 9 wherein the means for releasing said locking means includes a spring biased, fluid pressure operated piston which is constructed and arranged to be actuated upon application of pressure fluid to said actuator cylinder.

14. The combination set forth in claim 9 wherein the actuator includes an annular member rotatably connected to said rotatable member, the rotatable connection between said annular member and said rotatable member including a cam member coaxially disposed within said annular member and drivingly connected to said rotatable member, said cam member having a plurality of flats separated by a like number of arcuate surfaces, and a plurality of roller-lock mechanisms mounted on said flats, wherein the locking means includes a brake band cooperable with said annular member for preventing rotation thereof, and wherein the means for freeing said rotatable member for rotation with the locking means in the engaged position comprise a flanged member having a plurality of axially extending fingers operatively associated with said roller-lock mechanisms and operable to free the cam member for rotation relative to said annular member.

15. Interconnecting means for a plurality of actuators, each actuator having a cylinder, a reciprocable piston within the cylinder capable of fluid pressure actuation in either direction, and releasable locking means operatively associated with the piston for normally preventing movement of the piston in the absence of fluid pressure application to the cylinder, including in combination, a rotatable member in each actuator cylinder and operatively connected to the piston therein such that said member rotates in response to reciprocable piston movement, means operatively associated with the rotatable member and locking means of each actuator for effecting rotation of said member and consequent reciprocable piston movement with the locking means in the locked position in the absence of fluid pressure application to said actuator cylinder, and power transmitting means interconnecting the rotatable members of adjacent actuators, the construction and arrangement being such that fluid pressure actuation of one actuator will mechanically operate another actuator in synchronism therewith if the locking means of the other actuator fail to release.

16. An actuator assembly including in combination, a cylinder, a reciprocable piston in said cylinder, a member rotatably supported in said cylinder and operatively connected to said piston so as to rotate in response to piston reciprocation, a cam connected with said rotatable member, an annular element circumscribing said cam, roller-lock mechanism disposed between said cam and said annular element and normally operable to drivingly interconnect said cam and said annular element, releasable locking means operatively associated with said annular element for restraining rotation thereof so as to prevent piston movement when said annular element and said cam are drivingly interconnected by said roller-lock mechanism, and means operatively associated with said roller-lock mechanism for adjusting the said roller-lock mechanism to interrupt the driving connection between said annular element and said cam so as to permit piston movement with the locking means engaged.

No references cited.